United States Patent [19]

Fukui et al.

[11] Patent Number: 5,308,908
[45] Date of Patent: May 3, 1994

[54] POLYPROPYLENE RESIN COMPOSITION

[75] Inventors: Osamu Fukui, Tokyo; Kouhei Ueno, Sakai; Yoshifumi Nakano, Sakai; Ikunori Sakai, Sakai; Takao Nomura, Toyota; Takeyoshi Nishio, Toyota; Hisayuki Iwai, Toyota, all of Japan

[73] Assignee: Ube Industries, Ltd., Yamaguchi, Japan

[21] Appl. No.: 936,389

[22] Filed: Aug. 28, 1992

[30] Foreign Application Priority Data

Aug. 30, 1991 [JP] Japan .................................. 3-244231
Oct. 9, 1991 [JP] Japan .................................. 3-289412

[51] Int. Cl.$^5$ ...................... C08L 53/00; C08L 23/04; C08K 3/34
[52] U.S. Cl. ..................................... 524/451; 525/88; 525/240
[58] Field of Search ................... 525/240, 88; 524/451

[56] References Cited

U.S. PATENT DOCUMENTS 4,439,573 3/1984 Fukui et al. ......................... 524/451
4,748,206 5/1988 Nogiwa et al. ..................... 525/240

FOREIGN PATENT DOCUMENTS 55-21494 2/1980 Japan .
57-55952 4/1982 Japan .
57-159841 10/1982 Japan .
57-195134 11/1982 Japan .
57-207630 12/1982 Japan .
58-17139 2/1983 Japan .
58-111846 7/1983 Japan .

OTHER PUBLICATIONS

Abstract, Database WPIL, Section Ch., Week 8916, Derwent Publications Ltd., AN 89-119531.
Abstract, Database WPIL, Section Ch, Week 8939, Derwent Publications Ltd., AN 89-281432.
Abstract, Database WPIL, Section Ch, Week 9031, Derwent Publications Ltd., AN 90-207230.
European Search Report, EP 92 30 7833, dated Feb. 16, 1993.

Primary Examiner—Carman J. Seccuro, Jr.
Attorney, Agent, or Firm—Finnegan, Henderson, Farabow, Garrett & Dunner

[57] ABSTRACT

A polypropylene resin composition comprising:
(A) 45 to 70% by weight of an ethylene-propylene block copolymer synthesized under the process comprising the steps of;
  (a) polymerizing propylene with a Ziegler-Natta catalyst to obtain a highly crystalline polypropylene that contain not less than 97% by weight of a fraction insoluble in boiling n-heptane, and
  (b) copolymerizing ethylene with the polypropylene (a), and which
    (a) contains 0.5 to 10% by weight of ethylene,
    (b) contains 5 to 20% by weight of a fraction being soluble in p-xylene at room temperature and having an intrinsic viscosity value of not less than 2 (measured in decalin at 135° C.),
    (c) has a melt-flow index value of 30 to 100 g/10 min., and,
    (d) has a value of flexural modulus of not less than 18,000 kg/cm$^2$,
(B) 10 to 20% by weight of an amorphous ethylene-propylene copolymer having
  (a) an ethylene content of 70 to 90% by weight,
  (b) a Mooney viscosity value (ML$_{1+4}$ at 100° C.) of 5 to 70,
(C) 5 to 15% by weight of an ethylene-α-olefin copolymer having
  (a) an α-olefin content of 5 to 15% by mole,
  (b) a value of gravity of not more than 0.91, and
  (c) a melt-flow index value of 2.2 to 50 g/10 min. at 230° C.,
(D) 1 to 10% by weight of an amorphous ethylene-butene copolymer having
  (a) a butene content of 10 to 25% by weight, and
  (b) a Mooney viscosity value (ML$_{1+4}$, at 100° C.) of 5 to 20,
(E) not more than 15% by weight of a talc that
  (a) has an average diameter D50 of from 1.0 to 3.0 μm, and
  (b) does not contain a particle having a diameter of 10 μm or more, wherein the component (B) is rubber reinforced by lamellae of components (C) and (D).

7 Claims, 4 Drawing Sheets

Fig. 1

5000 X Magnification

5000 × Magnification

Fig. 4

POLYPROPYLENE RESIN COMPOSITION

BACKGROUND OF THE INVENTION

1. Field of the Invention

This invention relates to a polypropylene resin composition. More specifically, it relates to a polypropylene composition suitable for a large molding such as an automobile bumper.

2. Description of the Related Art

A polypropylene resin has often been used when molding such products as automobile bumpers because it is light, corrosion-proof, and intricately shaped products such as automobile bumpers can be easily molded from said resin.

Although a polypropylene resin is thought to be suitable for an automobile bumper, an automobile bumper made of a polypropylene resin does not have enough impact strength, and does not paint well. Recently, a polypropylene resin composition composed of a polypropylene polymer, an ethylene-propylene rubber, and an inorganic filler was used for an automobile bumper to improve the impact strength and paintability of the bumper. Japanese Unexamined Patent Publication (Kokai) No. 55-21494 discloses a composition of polyolefin such as an isotactic polypropylene, high density polyethylene, low density polyethylene, or ethylene-propylene copolymer, an elastomer such as ethylene-propylene rubber or ethylene-propylene-diene terpolymer, and an inorganic filler. Japanese Kokai Nos. 57-55952 and 58-111846 disclose a composition of a crystalline ethylene-propylene block copolymer, an amorphous ethylene-propylene copolymer, and a talc. Japanese Kokai No. 57-159841 discloses a composition of a crystalline ethylene-propylene block copolymer, an amorphous ethylene-propylene copolymer, a high density polyethylene, and a talc. Japanese Kokai No. 57-195134 discloses a composition of a polypropylene polymer, an elastomer, a compound selected from aromatic sulfonic acid, an aromatic carboxylic acid, a $C_4$ to $C_{12}$ aliphatic dicarboxylic acid, an aromatic phosphine, a metallic salt of the aromatic phosphine, and a dibenzylidene sorbitol, and an inorganic filler. Japanese Kokai Nos. 57-207630 and 58-17139 disclose a composition of a crystalline polyolefin, an ethylene-$\alpha$-olefin rubber, and an inorganic filler selected from talc, mica, and calcium silicate.

An automobile bumper molded from these compositions, although improved in impact strength, has a poor appearance, poor surface hardness, and poor paintability (i.e. paint coated on the automobile bumper is easily scratched off).

SUMMARY OF THE INVENTION

Accordingly, the object of this invention is to provide a polypropylene resin composition capable of producing an automobile bumper that has high impact strength, good appearance, high surface hardness, and excellent paintability.

In accordance with this invention, there is provided a polypropylene resin composition comprising:

(A) 45 to 70% by weight of a crystalline ethylene-propylene block copolymer, (B) 10 to 20% by weight of an amorphous ethylene-propylene copolymer, (C) 5 to 15% by weight of an ethylene-$\alpha$-olefin copolymer, (D) 1 to 10% by weight of an amorphous ethylene-butene copolymer, and (E) not more than 15% by weight of a talc.

In this invention, the component (B) mentioned above is reinforced by components (C) and (D) lamellae. In a polypropylene resin composition according to this invention, component (A) functions to make the composition flow well in a mold during molding and provide rigidity to the molding obtained, component (B) functions to provide impact strength to the molding obtained, component (C) is an ultra low density polyethylene and is dispersed as lamellae in the particles of component (B) to reinforce the same, and component (D) functions as an agent to make component (B) compatible with component (C).

BRIEF DESCRIPTION OF THE DRAWINGS

The present invention will be better understood from the description set forth below with reference to the accompanying drawings wherein.

In FIGS. 1 to 4, the dark gray areas are elastomeric component (components (B), (C) and (D) of this invention) domains and the light gray areas are crystalline ethylene-propylene copolymer component (component (A) of this invention) domains.

Figure 1:
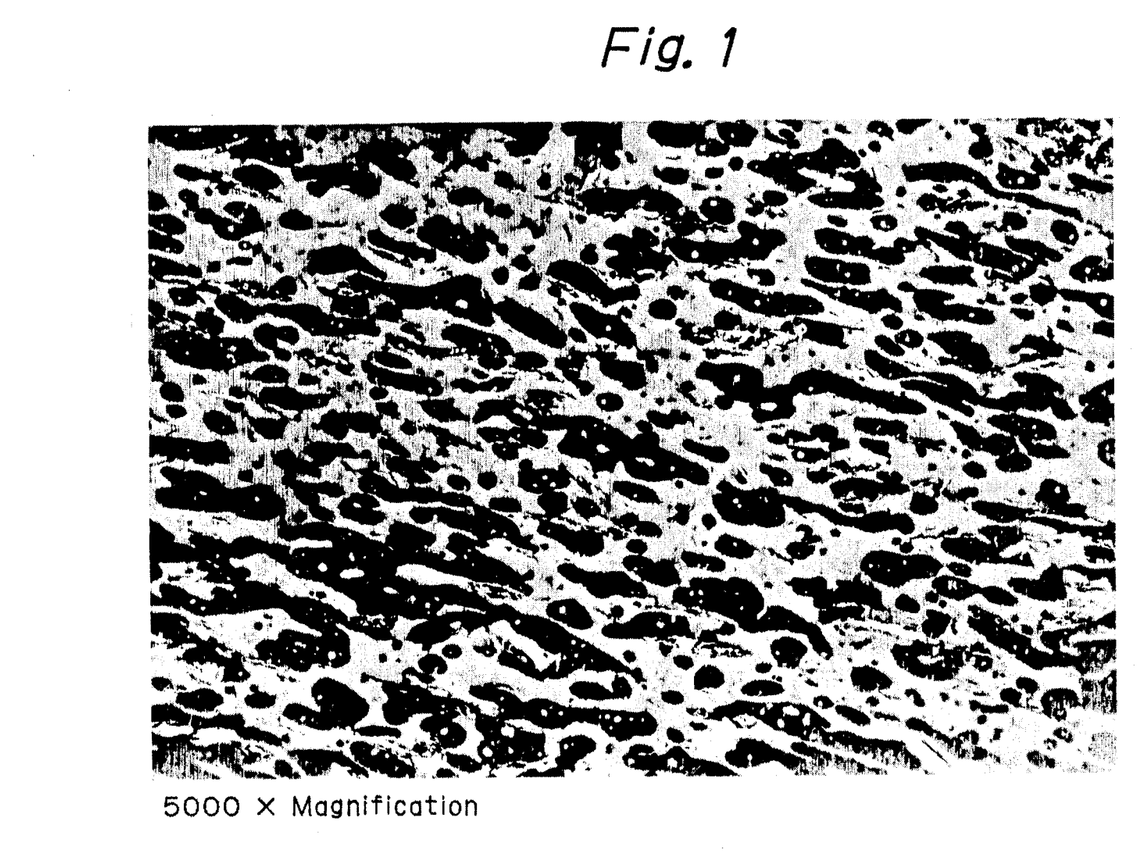
FIG. 1 is an electric microscope photograph ($\times 5,000$) of a cross section of an automobile bumper molded from the polypropylene resin of Example 4.
Figure 3:
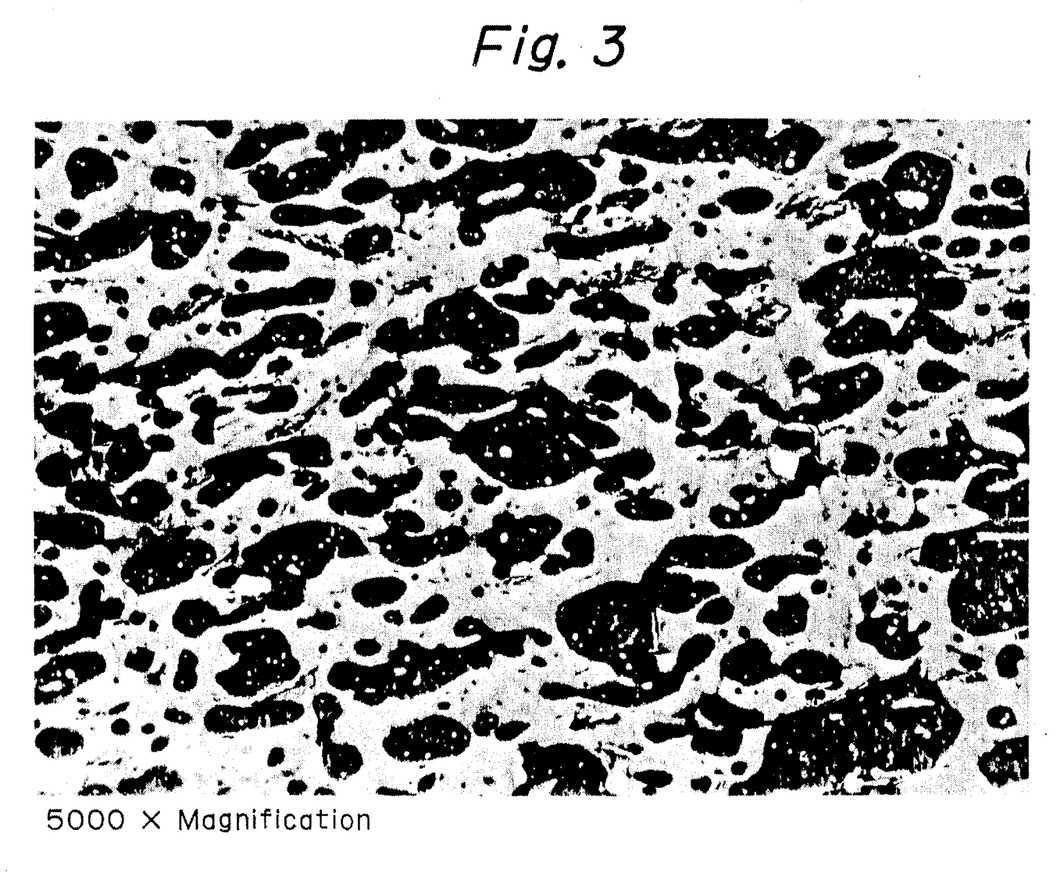
FIG. 3 is an electric microscope photograph ($\times 5,000$) of a cross section of an automobile bumper molded from the polypropylene resin of Comparative Example 3.
Figure 4:
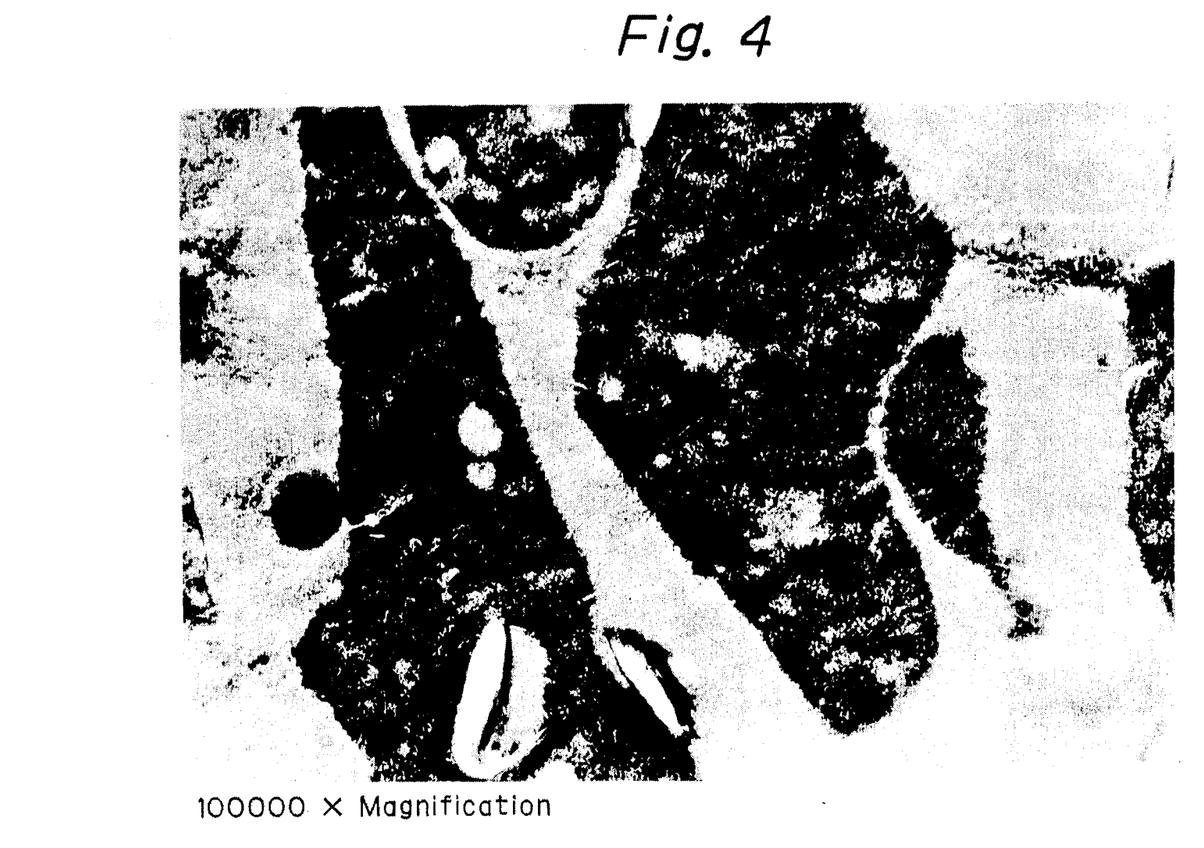
FIG. 4 is an electric microscope photograph ($\times 100,000$) of a cross section of the same automobile bumper of FIG. 3.

Comparing FIG. 1 with FIG. 3, it is apparent that a polypropylene resin composition of this invention has a structure quite different from that of an ordinary polypropylene resin composition. Although elastomeric components disperse insularly in the compositions of FIGS. 1 and 3, the elastomeric components of FIG. 1 disperse as flattened particles and the boundaries between elastomeric component domains and ethylene-propylene copolymer domains are unclear.

Figure 2:
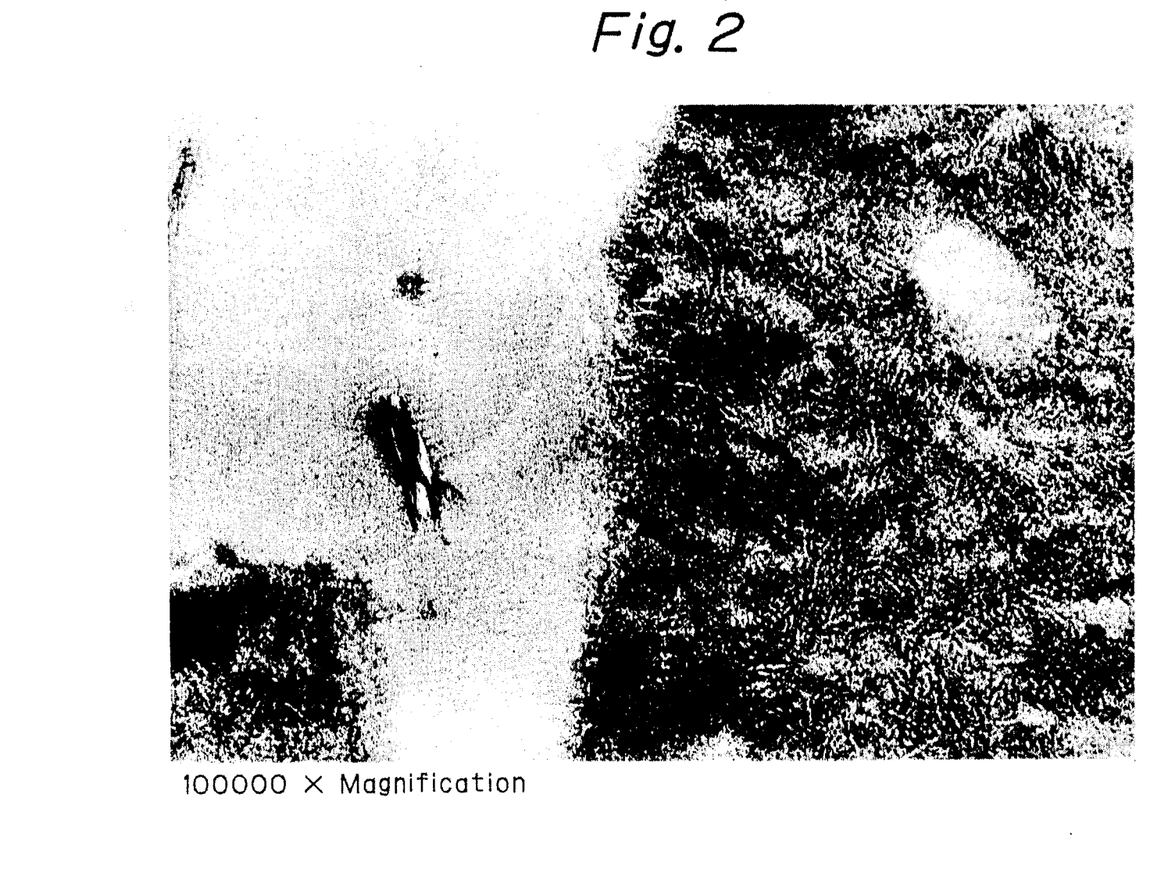
FIG. 2 is an electric microscope photograph ($\times 100,000$) of a cross section of the same automobile bumper of FIG. 1.

FIG. 2 shows that medium gray lamellae disperse in a dark gray area. The medium gray lamellae are lamellae of components (C) and (D). The dark gray area is a particle of component (B). This shows that components (C) and (D) disperses as lamellae in the particles of component (B).

DESCRIPTION OF THE PREFERRED EMBODIMENT

In this invention, component (A) is a highly crystalline ethylene-propylene block copolymer synthesized under the process comprising the steps of;

(a) polymerizing propylene with a Ziegler-Natta catalyst to obtain a highly crystalline polypropylene that contains not less than 97% by weight, preferably not less than 97.5% by weight of a fraction insoluble in boiling n-heptane, and (b) copolymerizing ethylene with the polypropylene (a).

This ethylene-propylene block copolymer mainly consists of a polypropylene fragment and an ethylene-propylene copolymer fragment. The polypropylene fragment is formed in the first step, the amorphous ethylene-propylene copolymer fragment is formed in the second step.

Component (A) should obtain 0.5 to 10% by weight, preferably 1.5 to 7% by weight of ethylene, and 5 to 20% by weight, preferably 6 to 15% by weight of a fraction soluble in p-xylene at room temperature and having an intrinsic viscosity of 2 or more, preferably 3 to 12, measured in decalin at 135° C. In addition, component (A) should have a melt-flow index value of 30 to 100 g/10 min., preferably 40 to 80 g/10 min., and a flexural modulus value of not less than 18,000 kg/cm$^2$, preferably 19,000 to 25,000 kg/cm$^2$.

When using a polypropylene which contains less than 97% by weight of a fraction insoluble in a boiling n-heptane to obtain component (A), a molding having insufficient surface hardness is obtained.

When an ethylene-propylene block copolymer which contains less than 0.5% by weight of ethylene is employed as component (A), a molding having sufficient impact strength cannot be obtained. On the other hand, when an ethylene-propylene block copolymer which contains more than 10% by weight of ethylene, a molding having sufficient surface hardness cannot be obtained.

When using a block copolymer having an intrinsic viscosity value of less than 2 (at 135° C, in decalin) as component (A), a molding having insufficient Izod impact strength at $-30°$ C. is obtained.

When using a block copolymer containing less than 5% by weight of a fraction soluble in p-xylene at room temperature as component (A), a molding having insufficient impact strength is obtained. On the other hand, when a block copolymer containing more than 20% by weight is employed, a molding having insufficient rigidity is obtained.

When using a block copolymer having a melt flow index value of less than 30 g/10 min. as component (A), a polypropylene resin composition does not flow well in a mold and a molding having a poor appearance is obtained. On the other hand, when employing a block copolymer having a melt flow index value of more than 100 g/10 min. as component (A), a molding having insufficient impact strength is obtained.

When employing a block copolymer having a value of a flexural modulus of less than 18,000 kg/cm$^2$, a molding having insufficient rigidity and insufficient surface hardness is obtained.

Component (B) according to this invention is an amorphous ethylene-propylene copolymer i.e., an ethylene propylene rubber. Component (B) should contain 70 to 90% by weight, preferably 72 to 85% by weight of ethylene and has a Mooney viscosity value (ML$_{1+4}$ at 100° C.) of 5 to 70, preferably 10 to 60.

When employing an amorphous ethylene-propylene copolymer which contains less than 70% by weight of ethylene as component (B), a molding having insufficient surface hardness is obtained. On the other hand, when employing an amorphous ethylene-propylene copolymer which contains more than 90% by weight of ethylene as component (B), a molding having insufficient impact strength is obtained.

An amorphous ethylene-propylene copolymer having a Mooney viscosity value of less than 5 is not suitable for component (B), because such a copolymer has too a small molecular weight and the molding obtained is insufficient in impact strength. An amorphous ethylene-propylene copolymer having a Mooney viscosity value of more than 70 is not suitable, too, because such a copolymer has too large a molecular weight and it is hard to disperse such a copolymer into component (A).

Component (C) is an ethylene-$\alpha$-olefin copolymer which is called an ultra low density polyethylene. In this invention, a copolymer of ethylene and an $\alpha$-olefin having 4 to 10 carbon atoms can be employed as component (C). Ethylene-butene-1 copolymer, ethylenebutene-1 copolymer, ethylene-4-methylpentene-1 copolymer, ethylene-1-hexene copolymer, and ethylene-1-octene copolymer are preferably employed in this invention. Especially, ethylene-butene-1 copolymer and ethylene-4-methylpentene-1 copolymer are preferable.

Component (C) should have an $\alpha$-olefin content of from 5 to 15% by mole, preferably 7 to 15% by mole and have a gravity of 0.91 or less. Component (C) should have a melt flow index value at 230° C. of from 2.2 to 50 g/10 min., preferably 6 to 40 g/10 min.

When employing an ethylene-$\alpha$-olefin copolymer containing less than 5% by mole of an $\alpha$-olefin as component (C), lamellae of component (C) reinforces component (B) excessively and thereby reducing the impact strength of the molding obtained. On the other hand, when employing an ethylene-$\alpha$-olefin copolymer containing more than 15% by mole of an $\alpha$-olefin as component (C), component (B) is not sufficiently reinforced by component (C) and the molding is obtained insufficient in surface hardness and flexural modulus.

When a gravity value of component (C) is more than 0.91, a molding insufficient in impact strength is obtained.

Component (D) is an amorphous ethylene-butene copolymer having a butene content of 10 to 25% by weight and a Mooney viscosity value (ML$_{1+4}$, at 100° C.) of 5 to 20.

When employing an amorphous ethylene-butene copolymer having a butene content of less than 10% by weight or an amorphous ethylene-butene copolymer having a Mooney viscosity value of less than 5 as component (D), a molding insufficient in impact strength is obtained. On the other hand, when employing an amorphous ethylenebutene copolymer having a butene content of more than 25% by weight, a molding that is too soft is obtained.

Compound (E) is a talc having an average diameter of 1.0 to 3.0 $\mu$m, preferably having 1.0 to 2.5 $\mu$m and not containing a fraction having a diameter of more than 10 $\mu$m.

When employing a talc having an average diameter of less than 1 $\mu$m, it is difficult to disperse the talc. On the other hand, when employing a talc having an average diameter of more than 3 $\mu$m, the molding obtained is too rigid.

A talc treated with a surface treatment agent can be employed as component (E) in this invention. As a surface treatment agent, a silan coupling agent, an aliphatic acid, a metal carboxylate, an unsaturated carboxylic acid, an unsaturated carboxylic acid derivative, an organic titanate, a resin acid, a metallic resinate, and a polyethylene glycol ether can be included.

The amount of component (A) should be 45 to 70% by weight, preferably 50 to 60% by weight. When the amount of component (A) is less than 45% by weight, the polypropylene resin composition does not flow well in a mold during molding and a molding with a good appearance cannot be obtained. On the other hand, when the amount of the component (A) exceeds 70% by weight, a molding having poor paintability, i.e., paint coated on the molding is easily scratched off, is obtained.

The amount of component (B) should be 10 to 20% by weight, preferably 12 to 20% by weight. When the amount of component (B) is less than 10% by weight, a molding having insufficient impact strength and poor paintability is obtained. On the other hand, when the amount of the component (B) exceeds 20% by weight, a molding insufficient in rigidity is obtained.

The amount of component (C) should be 5 to 15% by weight, preferably 8 to 15% by weight. When the amount of component (C) is less than 5% by weight, a molding obtained from this polypropylene resin composition has insufficient impact strength. On the other hand, when the amount of the component (C) exceeds 15% by weight, a molding having insufficient rigidity is obtained.

The amount of component (D) should be 1 to 10% by weight, preferably 1 to 5% by weight. When a polypropylene resin composition contains less than 1% by weight, or more than 10% by weight, of component (D), a molding obtained from the composition is insufficient in rigidity and impact strength.

The amount of component (E) should be 15% by weight or less, preferably 8 to 15% by weight, more preferably 10 to 15% by weight. When a polypropylene resin composition contains more than 15% by weight of component (E), a molding obtained from the composition is sufficient in impact strength.

The polypropylene resin composition of this invention may contain any conventional ingredients such as pigments, antioxidants, ultraviolet absorbents, and lubricants, unless the desired properties thereof are not adversely effected.

The polypropylene resin composition of this invention can be prepared by mixing the above-mentioned melted components with an apparatus such as a V-type blender, a single- or twin-screw extruder, a Banbury mixer, a continuous mixer, or a mixing roll. All of the components can be mixed at the same time to prepare a polypropylene resin composition of this invention. This polypropylene resin composition can be prepared by another process, e.g., mixing component (A) and (E) at first, then, mixing components (B), (C), and (D) to the mixture of components (A) and (E).

EXAMPLES

This invention will be further illustrated in detail by, but by no means limited to, the following Examples wherein "parts" are all by weight unless otherwise noted.

EXAMPLES 1 TO 10 AND COMPARATIVE EXAMPLES 1 TO 16

Component (A) to (E) were blended according to the recipe shown in Table 1. A 0.1 part amount of 2,6-ditertiary butyl-4-methylphenol and 0.3 parts of pentaerithrityl-tetrakis[3-(3,5-di-tertiary butyl-4hydroxyphenyl)-propionate (i.e., both of them antioxidant), 0.3 parts of bis(2,2,6,6-tetramethyl-4piperidyl) sebacate (i.e., ultraviolet absorbent), 0.2 parts of magnesium stearate and 0.2 parts of magnesium stearate (i.e., both of them are lubricant) and 1.0 part of carbon black were added to the polypropylene resin composition. All of the components and additives were mixed with a tumbler, then, the mixture was melted and blended with a twin-screw extruder at 220° C. to obtain polypropylene resin compositions. The polypropylene resin compositions thus obtained were molded into test pieces with an injection molding machine under the conditions mentioned below;

(1) Injection molding machine; UBE MAX D150-10
(2) Shape of test piece;
  rectangular, size: 360 mm×140 mm×3 mm (test pieces for appearance measurement)
  rectangular, size: 50 mm×90 mm×2 mm (test pieces for paintability measurement)
(3) Injection temperature; 220° C.
(4) Injection pressure; 980 kg/cm²
(5) Holding pressure; 420 kg/cm²
(6) Temperature of mold; 50° C.

The physical properties of the polypropylene resin compositions and those of the test pieces were measured as mentioned below:
(1) Melt flow index; according to ASTM D1238
(2) Gravity; according to ASTM D1505
(3) Brittle point temperature; according to JIS K7216

(4) Izod impact strength; according to ASTM D256 (measured at −30° C.)
(5) Flexural modulus; according to ASTM D790 (measured at 23° C.)
(6) Surface hardness; according to ASTM D785
(7) Appearance of test piece; optically measured ○; No stripe was seen on the surface Δ; Stripe was seen on half of the area ×; Stripe was seen on almost all of the area Paintability of the test pieces was measured as mentioned below. The test pieces were exposed to saturated vapor of 1,1,1-trichloroethane for 30 seconds to clean the surface of the test pieces. Then, the test pieces were placed in an oven kept at 90° C. for 10 minutes to dry.

Then the test pieces were treated with plasma under the conditions mentioned below:
(1) Pressure; 1 0 torr
(2) Microwave output; 0.05 kw
(3) Treatment time; 0.3 sec.
(4) Gas flow; 600 cc/min.
(5) Gas; air.

After the plasma treatment, the test pieces were coated with one liquid-type polyurethane top coat paint at a thickness of 40 μm. Then, dried at 120° C. for 30 min.; the test pieces were then left at room temperature for 48 hr.

The painted surfaces of the test pieces were cut with a knife into 100 squares, each of which had a size of 1 mm×1 mm. Then, a sticking cellophane tape was applied on the surface and was peeled off, and thereafter the number of squares where the paint was peeled off was counted. In table 1, ○ indicates that there was no square where the paint was peeled off. Δ indicates that there were 1 to 10 squares where the paint was peeled off. × indicates that there were 11 or more squares where the paint was peeled off.

The components employed in the Examples and Comparative Examples are mentioned below.

| | | Component (A): | | | |
|---|---|---|---|---|---|
| | A-1 | A-2 | A-3 | A-4 | A-5 |
| (a) Ethylene content (Wt %) | 5.0 | 4.5 | 5.0 | 4.3 | 7.0 |
| (b) Boiling n-heptane insoluble | 97.6 | 97.8 | 97.5 | 97.5 | 93.8 |

-continued

|   | | B-1 | B-2 | B-3 | B-4 | B-5 |
|---|---|---|---|---|---|---|
| fraction in the PP fraction (Wt %) | | | | | | |
| (c) Intrinsic viscosity of r.t. p-xylene soluble fraction | | 4.1 | 4.5 | 4.0 | 4.3 | 4.2 |
| (d) Melt-flow index (g/10 min.) | | 43 | 47 | 28 | 35 | 42 |
| (e) Flexural modulus (kg/cm²) | | 18,500 | 19,000 | 18,100 | 18,000 | 15,600 |

Component (B):

|   | | B-1 | B-2 | B-3 | B-4 | B-5 |
|---|---|---|---|---|---|---|
| (a) Ethylene content (Wt %) | | 75 | 73 | 75 | 75 | 75 |
| (b) $ML_{1+4}$ (100° C.) | | 34 | 10 | 70 | 34 | 72 |

Component (C):

|   | C-1 | C-2 | C-3 |
|---|---|---|---|
| (a) MI (g/10 min.) | 10 | 30 | 2 |
| (b) Content of 1-butene | 8 | 10 | 4 |
| (c) Gravity (g/cm³) | 0.90 | 0.89 | 0.92 |

Component (D):

|   | D-1 | D-2 |
|---|---|---|
| (a) Butene content (Wt %) | 15 | 9 |
| (b) $ML_{1+4}$ (100° C.) | 13 | 15 |

Component (E):

|   | E-1 | E-2 |
|---|---|---|
| (a) Average diameter (μm) | 2.4 | 3.5 |
| (b) Portion of particle having diameter of 10 μm or more. | 0 | 4.6 |

TABLE 1

|  |  |  | Example |  |  |  |  |  | Comparative Example |  |
|---|---|---|---|---|---|---|---|---|---|---|
|  |  |  | 1 | 2 | 3 | 4 | 5 | 6 | 1 | 2 |
| Crystalline ethylene-propylene block copolymer | A-1 | wt % | 57 | 53 | — | — | — | — | — | — |
|  | A-2 |  | — | — | 55 | 56 | 58 | 57 | — | — |
|  | A-3 |  | — | — | — | — | — | — | 56 | — |
|  | A-4 |  | — | — | — | — | — | — | — | 57 |
| Amorphous ethylene-propylene copolymer | B-1 | wt % | 16 | — | — | 16 | 15 | 10 | 16 | — |
|  | B-2 |  | — | 12 | 14 | — | — | — | — | 16 |
|  | B-3 |  | — | — | — | — | — | — | — | — |
| Ethylene-α-olefin copolymer | C-1 | wt % | — | 10 | 9 | — | — | — | — | — |
|  | C-2 |  | 11 | — | — | 12 | 12 | 15 | 12 | 11 |
|  | C-3 |  | — | — | — | — | — | — | — | — |
| Amorphous ethylene-butene copolymer | D-1 | wt % | 3 | 10 | 9 | 3 | 4 | 5 | 3 | 3 |
|  | D-2 |  | — | — | — | — | — | — | — | — |
| Talc | E-1 | wt % | 13 | 15 | 13 | 13 | 11 | 13 | 13 | 13 |
|  | E-2 |  | — | — | — | — | — | — | — | — |
| Melt flow index |  | g/10 min | 20.3 | 19.0 | 22.4 | 21.5 | 22.8 | 21.1 | 16.5 | 22.3 |
| Brittle point temp. |  | °C. | −27 | −26 | −27 | −30 | −30 | −24 | −31 | −27 |
| Izod impact strength |  | kg·cm/cm | 8.2 | 7.8 | 8.2 | 8.8 | 8.0 | 7.6 | 8.9 | 8.6 |
| Flexural modulus |  | kg/cm² | 15800 | 16200 | 15700 | 15200 | 15000 | 17600 | 15000 | 14700 |
| Surface hardness |  | R-scale | 59 | 63 | 62 | 58 | 60 | 64 | 57 | 53 |
| Surface smoothness |  | ○ × | ○ | ○ | ○ | ○ | ○ | ○ | ○ | × |

|  |  |  | Comparative Example |  |  |  |  |  |  |  |
|---|---|---|---|---|---|---|---|---|---|---|
|  |  |  | 3 | 4 | 5 | 6 | 7 | 8 | 9 | 10 |
| Crystalline ethylene-propylene block copolymer | A-1 | wt % | — | — | — | — | — | 52 | 52 | 51 |
|  | A-2 |  | — | 55 | 56 | 57 | 56 | — | — | — |
|  | A-3 |  | — | — | — | — | — | — | — | — |
|  | A-4 |  | 63 | — | — | — | — | — | — | — |
| Amorphous ethylene-propylene copolymer | B-1 | wt % | — | — | 16 | 10 | 16 | 21 | 16 | 16 |
|  | B-2 |  | 27 | — | — | — | — | — | — | — |
|  | B-3 |  | — | 14 | — | — | — | — | — | — |
| Ethylene-α-olefin copolymer | C-1 | wt % | — | — | — | — | — | — | — | — |
|  | C-2 |  | — | 9 | — | 5 | 12 | 11 | 16 | 11 |
|  | C-3 |  | — | — | 12 | — | — | — | — | — |
| Amorphous ethylene-butene copolymer | D-1 | wt % | — | 9 | 3 | — | 3 | 3 | 3 | 3 |
|  | D-2 |  | — | — | — | 15 | — | — | — | — |
| Talc | E-1 | wt % | 10 | 13 | 13 | 13 | — | 13 | 13 | 19 |
|  | E-2 |  | — | — | — | — | 13 | — | — | — |
| Melt flow index |  | g/10 min | 27.8 | 16.2 | 17.3 | 17.8 | 22.2 | 16.0 | 21.3 | 17.9 |

TABLE 1-continued

| | | | | | | | | | |
|---|---|---|---|---|---|---|---|---|---|
| Brittle point temp. | °C. | | −36 | −30 | −19 | −18 | −26 | −38 | −32 | −14 |
| Izod impact strength | kg · cm/cm | | 9.6 | 8.5 | 6.6 | 6.8 | 7.5 | 11.9 | 10.7 | 5.9 |
| Flexural modulus | kg/cm² | | 12200 | 13800 | 18000 | 17700 | 14800 | 12500 | 13300 | 19500 |
| Surface hardness | R-scale | | 41 | 51 | 66 | 65 | 56 | 45 | 54 | 57 |
| Surface smoothness | | | ○ x | x | ○ | ○ | ○ | ○ | ○ | ○ | ○ |

| | | | Example | | | | Comparative Example | | |
|---|---|---|---|---|---|---|---|---|---|
| | | | 7 | 8 | 9 | 10 | 11 | 12 | 13 |
| Crystalline ethylene-propylene block copolymer | A-1 | wt % | 62 | 65 | — | — | — | — | 61 |
| | A-4 | | — | — | 66 | 72 | — | — | — |
| | A-5 | | — | — | — | — | 63 | 62 | — |
| Amorphous ethylene-propylene copolymer | B-4 | wt % | 15 | 12 | 16 | 14 | 27 | 15 | — |
| | B-5 | | — | — | — | — | — | — | 16 |
| Ethylene-α-olefin copolymer | C-1 | wt % | 12 | 13 | 8 | 10 | — | 12 | 12 |
| | C-2 | | — | — | — | — | — | — | — |
| Amorphous ethylene-butene copolymer | D-1 | wt % | 4 | 5 | 6 | 4 | — | 4 | 4 |
| | D-2 | | — | — | — | — | — | — | — |
| Talc | E-1 | wt % | 7 | 5 | 4 | — | — | 7 | 7 |
| | E-2 | | — | — | — | — | 10 | — | — |
| Melt flow index | g/10 min | | 24.1 | 25.6 | 16.5 | 17.9 | 23.6 | 20.8 | 18.9 |
| Gravity | g/cm³ | | 0.940 | 0.925 | 0.920 | 0.895 | 0.964 | 0.939 | 0.940 |
| Brittle point temp. | °C. | | −33 | −31 | −37 | −40 | −34 | −27 | −36 |
| Izod impact strength | kg · cm/cm | | 9.2 | 9.8 | 10.4 | 10.5 | 8.9 | 8.3 | 10.4 |
| Flexural modulus | kg/cm² | | 12,800 | 12,600 | 11,600 | 10,200 | 11,700 | 9,700 | 9,300 |
| Surface hardness | R-scale | | 62 | 67 | 61 | 63 | 37 | 47 | 49 |
| Appearance | | | ○ Δ x | ○ | ○ | ○ | ○ | x | ○ | ○ |
| Paintability | | | ○ Δ x | ○ | ○ | ○ | ○ | Δ | Δ | ○ |

| | | | Comparative Example | | |
|---|---|---|---|---|---|
| | | | 14 | 15 | 16 |
| Crystalline ethylene-propylene block copolymer | A-1 | wt % | 66 | 64 | 65 |
| | A-4 | | — | — | — |
| | A-5 | | — | — | — |
| Amorphous ethylene-propylene copolymer | B-4 | wt % | 12 | 10 | 8 |
| | B-5 | | — | — | — |
| Ethylene-α-olefin copolymer | C-1 | wt % | 12 | 18 | 10 |
| | C-2 | | — | — | — |
| Amorphous ethylene-butene copolymer | D-1 | wt % | — | 3 | 12 |
| | D-2 | | 5 | — | — |
| Talc | E-1 | wt % | 5 | 5 | 5 |
| | E-2 | | — | — | — |
| Melt flow index | g/10 min | | 25.8 | 28.0 | 23.9 |
| Gravity | g/cm³ | | 0.927 | 0.926 | 0.926 |
| Brittle point temp. | °C. | | −28 | −25 | −25 |
| Izod impact strength | kg · cm/cm | | 8.7 | 8.0 | 8.8 |
| Flexural modulus | kg/cm² | | 12,800 | 12,800 | 12,500 |
| Surface hardness | R-scale | | 68 | 66 | 67 |
| Appearance | | | ○ Δ x | ○ | Δ | ○ |
| Paintability | | | ○ Δ x | Δ | Δ | ○ |

We claim:

1. A polypropylene resin composition comprising:
(A) 45 to 70% by weight of an ethylene-propylene block copolymer synthesized under the process comprising the steps of:
  (a) polymerizing propylene with a Ziegler-Natta catalyst to obtain a highly crystalline polypropylene that contains not less than 97% by weight of a fraction insoluble in boiling n-heptane, and
  (b) copolymerizing ethylene with the polypropylene polymerized in step (a),
  wherein said component (A):
  (a) contains 0.5 to 10% by weight ethylene,
  (b) contains 5 to 20% by weight of a fraction which is soluble in p-xylene at room temperature and which has an intrinsic viscosity value of not less than 2 (measured in decalin at 135° C.),
  (c) has a melt-flow index value of 30 to 100 g/10 min., and
  (d) has a value of flexural modulus of not less than 18,000 kg/cm²; and
(B) 10 to 20% by weight of an amorphous ethylene-propylene copolymer having:
  (a) an ethylene content of 70 to 90% by weight,
  (b) a Mooney viscosity value ($ML_{1+4}$ at 100° C.) of 5 to 70,
(C) 5 to 15% by weight of an ultra low density ethylene-C4–C10-α-olefin copolymer having:
  (a) an α-olefin content of 5 to 15% by mole,
  (b) a specific gravity of not more than 0.91, and
  (c) a melt-flow index value of 2.2 to 50 g/10 min. at 230° C.,
(D) 1 to 10% by weight of an amorphous ethylene-butene copolymer having:

(a) a butene content of 10 to 25% by weight, and (b) a Mooney viscosity value ($ML_{1+4}$, at 100° C.) of 5 to 20, (E) a positive amount up to not more than 15% by weight of a talc that (a) has an average diameter D50 of from 1.0 to 3.0 μm, and (b) does not contain a particle having a diameter of 10 μm or more, wherein the component (B) is rubber reinforced by lamellae of components (C) and (D).

2. A polypropylene composition as claimed in claim 1, wherein the content of component (E) is 8 to 15% by weight.

3. A polypropylene composition as claimed in claim 1, wherein the content of component (E) is less than 8% by weight.

4. A polypropylene composition as claimed in claim 1, wherein the ethylene component of component (A) is 1.5 to 7.0% by weight.

5. A polypropylene composition as claimed in claim 1, wherein the component (A) has a polypropylene component containing 97.5% by weight or more of a fraction which is insoluble in a boiling n-heptane.

6. A polypropylene composition as claimed in claim 1, wherein the component (A) has a p-xylene soluble fraction having an intrinsic viscosity value of from 3 to 12.

7. A polypropylene composition as claimed in claim 1, wherein the component (C) is a copolymer of ethylene and 1-butene.

* * * * *